(12) United States Patent
Zhang et al.

(10) Patent No.: US 8,011,557 B1
(45) Date of Patent: Sep. 6, 2011

(54) AUTOMATIC SOLDERING MACHINE

(75) Inventors: Shao-bo Zhang, Tu Cheng (TW);
Sung-lin Chen, Tu Cheng (TW);
Xiao-lin Wu, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 0 days.

(21) Appl. No.: 12/850,591

(22) Filed: Aug. 4, 2010

(51) Int. Cl.
*B23K 37/04* (2006.01)

(52) U.S. Cl. ............... 228/4.5; 228/8; 228/43; 228/44.7

(58) Field of Classification Search .................. None
See application file for complete search history.

(56) References Cited

U.S. PATENT DOCUMENTS

| | | | | |
|---|---|---|---|---|
| 2,494,137 | A * | 1/1950 | Martines | 29/860 |
| 3,778,883 | A * | 12/1973 | Bethsold | 228/201 |
| 3,780,928 | A * | 12/1973 | Shirn | 228/13 |
| 3,799,789 | A * | 3/1974 | Pierre-Louis et al. | 427/175 |
| 4,024,630 | A * | 5/1977 | Wahren et al. | 29/825 |
| 4,034,472 | A * | 7/1977 | Cover et al. | 29/749 |
| 4,072,176 | A * | 2/1978 | Friend | 140/93 R |
| 4,268,739 | A * | 5/1981 | Evans | 219/56.1 |
| 4,364,289 | A * | 12/1982 | Sorensen | 81/9.51 |
| 4,545,520 | A * | 10/1985 | Kent | 228/180.1 |
| 4,588,468 | A * | 5/1986 | McGinty et al. | 156/345.1 |
| 4,700,044 | A * | 10/1987 | Hokanson et al. | 219/121.63 |
| 4,860,427 | A * | 8/1989 | Kawaguchi | 29/564.4 |
| 4,987,678 | A * | 1/1991 | Satterfield et al. | 29/868 |
| 5,242,314 | A * | 9/1993 | Di Giulio et al. | 439/404 |
| 5,281,762 | A * | 1/1994 | Long et al. | 174/78 |
| 5,442,848 | A * | 8/1995 | Koller et al. | 29/566.1 |
| 5,667,131 | A * | 9/1997 | Sugiyama | 228/173.5 |
| 5,668,702 | A * | 9/1997 | Nassimi | 361/820 |
| 5,806,179 | A * | 9/1998 | Hassanzadeh | 29/860 |
| 5,971,251 | A * | 10/1999 | Moore et al. | 228/112.1 |
| 5,996,879 | A * | 12/1999 | Takada | 228/179.1 |
| 6,351,884 | B1 * | 3/2002 | Damaschke et al. | 29/842 |
| 7,845,541 | B1 * | 12/2010 | Chen et al. | 228/41 |
| 2004/0134965 | A1 * | 7/2004 | Stepan | 228/1.1 |
| 2006/0169742 | A1 * | 8/2006 | Fujimoto et al. | 228/4.5 |
| 2009/0288762 | A1 * | 11/2009 | Wolfel | 156/247 |

FOREIGN PATENT DOCUMENTS

WO  WO-9303518 A * 2/1993

* cited by examiner

*Primary Examiner* — Kiley Stoner
(74) *Attorney, Agent, or Firm* — Cheng-Ju Chiang

(57) ABSTRACT

An automatic soldering machine for soldering wires, each exposing at least one core wire and electronic components with at least one soldering portion respectively is disclosed. The automatic soldering machine comprises an equipment, a delivery mechanism, a plurality of clamps, a feeding mechanism, an insulation removing mechanism, a soldering mechanism, an unloading mechanism and a programmable control system. The delivery mechanism delivers the wires. The clamps locate the wires. The feeding mechanism conveys the electronic components. The insulation removing mechanism cuts the core wires and strips insulations at tops of the core wires. The soldering mechanism solders the core wires and the soldering portions of the electronic components. The unloading mechanism separates the soldered electronic components and core wires off from the clamps. The programmable control system is connect to the aforesaid mechanisms and controls thereof with high production efficacy and stable production quality.

14 Claims, 6 Drawing Sheets

AUTOMATIC SOLDERING MACHINE

BACKGROUND OF THE INVENTION

1. Field of the Invention

The present invention generally relates to an automatic soldering machine, and more particularly to an automatic soldering machine for soldering wires and electronic components.

2. Description of Prior Art

When the USB connection cables, the HDMI connection cables and etc. for connecting the electrical devices are fabricated, the wires and the soldering portions of the conductive terminals of the electronic components in the electrical devices have to be soldered. According to prior arts, mainly, a soldering process for the connection cables is a manual soldering. First, the oxidized tops of the core wires have to be manually cut and the insulations of the tops of the core wires also have to be manually stripped to expose the core wires for soldering. Then, an operation of a soldering gun for soldering the exposed core wires with the soldering portions of the conductive terminals of the electronic components have to be executed manually, still.

However, the aforesaid manual operations require respective individual procedures. The fabrication time takes too long and the productivity is low. Besides, the manual operations involve many human factors and the problems of non-uniform solder amounts can easily happen. Therefore, production quality becomes not stable.

SUMMARY OF THE INVENTION

For solving the drawbacks of prior art, an automatic soldering machine is provided to decrease manpower and raw material consumption and accordingly to realize a high production efficacy and a stable production quality of soldering process.

For realizing the aforesaid objective, the present invention provides an automatic soldering machine for soldering a plurality of wires, each exposing at least one core wire and a plurality of electronic components with at least one soldering portion respectively is disclosed. The automatic soldering machine comprises an equipment, a delivery mechanism, a plurality of clamps, a feeding mechanism, an insulation removing mechanism, a soldering mechanism, an unloading mechanism and a programmable control system. The delivery mechanism is installed on the equipment to deliver the wires. The clamps are positioned on the delivery mechanism to locate the wires. The feeding mechanism is installed at one end of the delivery mechanism to convey the electronic components. The insulation removing mechanism is installed at one side of the delivery mechanism to cut the core wires and strip insulations of headends of the core wires. The soldering mechanism is installed beside the insulation removing mechanism to solder the core wires and the soldering portions of the electronic components. The unloading mechanism is installed beside the soldering mechanism to separate the soldered electronic components and core wires off from the clamps. The programmable control system is connected to the delivery mechanism, the insulation removing mechanism, the soldering mechanism and the unloading mechanism, and controls the aforesaid mechanisms.

As aforementioned, the insulation removing mechanism of the automatic soldering machine cuts the core wires and strips the insulations at the tops of the core wires without manual cutting and manual stripping of prior art. The soldering mechanism solders the core wires and the soldering portions of the electronic components without manual soldering of prior art. Therefore, a high production efficacy and a stable production quality for soldering process can be realized.

DETAILED DESCRIPTION OF THE INVENTION

Figure 1:
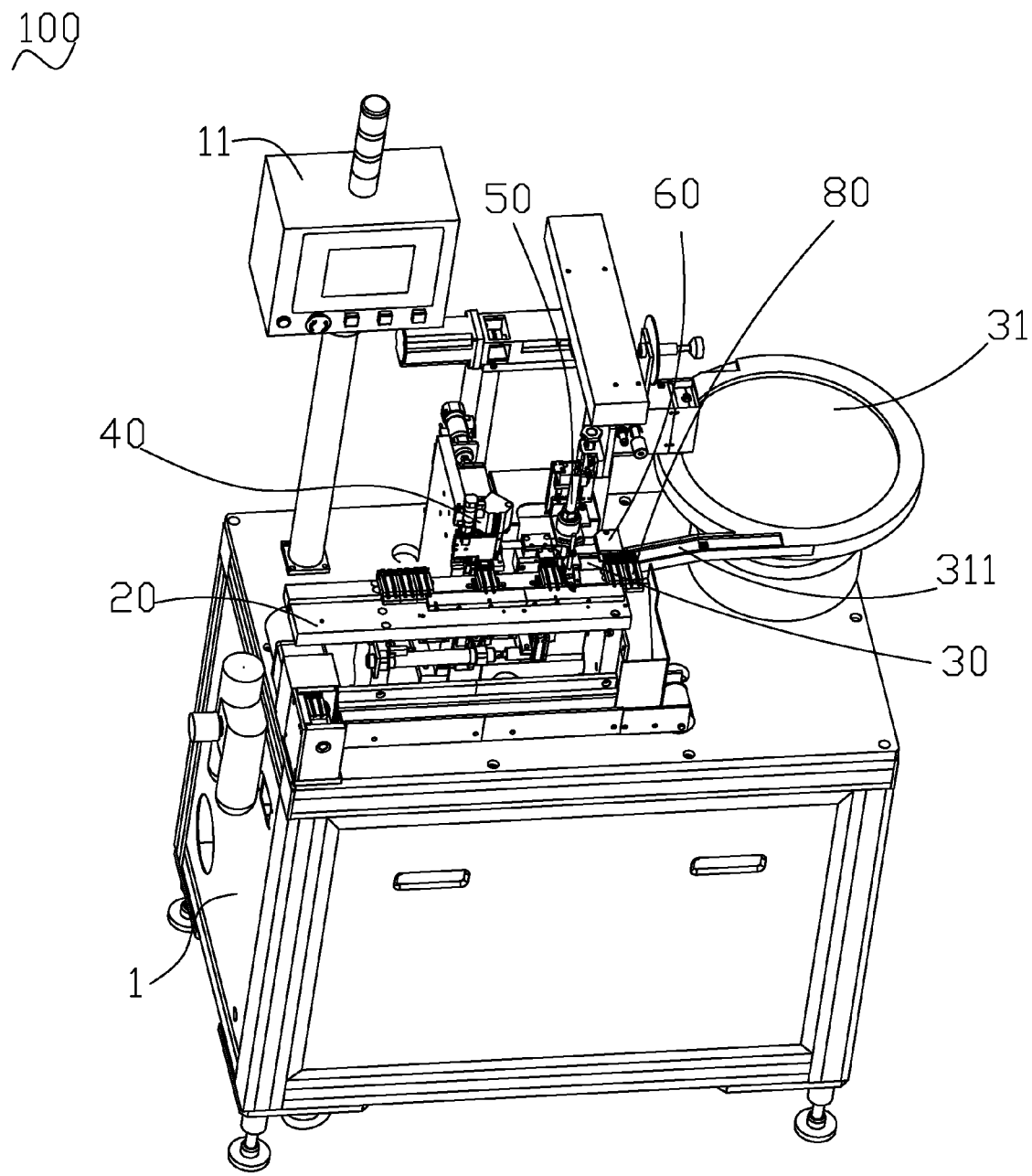
FIG. 1 depicts a structure diagram of an automatic soldering machine according to the present invention.
Figure 10:
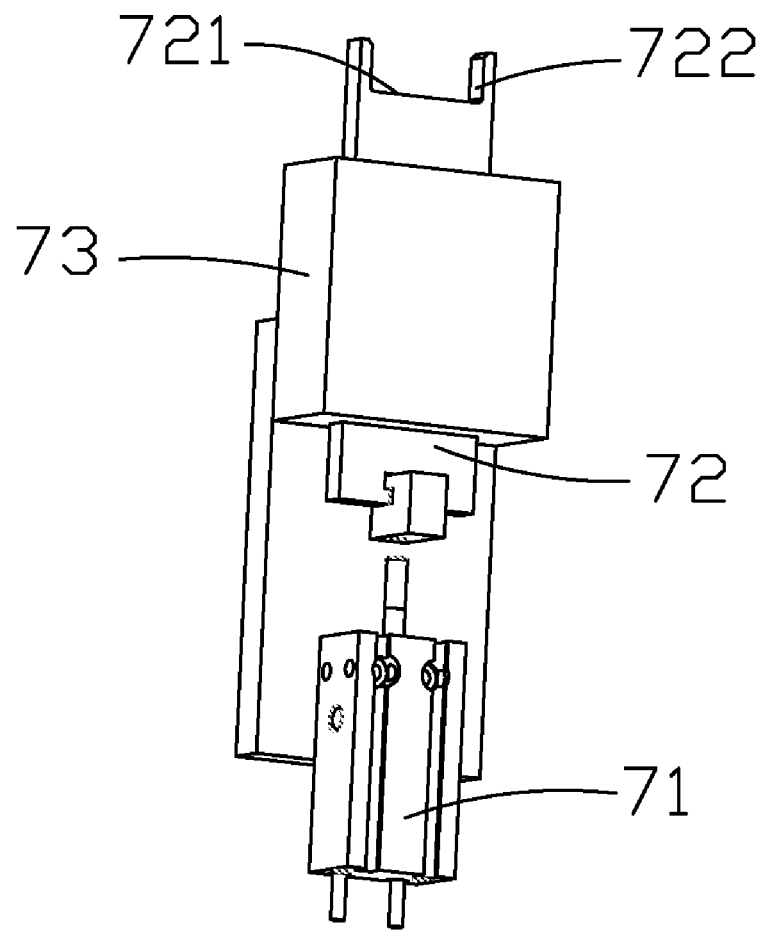
FIG. 10 shows a structure diagram of a locating mechanism of the automatic soldering machine shown in FIG. 1.

Please refer to FIG. 1 and FIG. 10. An automatic soldering machine 100 of the present invention is employed for soldering wires (not shown) and electronic components (not shown). Each wire exposes at least one core wire (not shown). Each electronic component has at least one soldering portion (not shown). The automatic soldering machine 100 comprises an equipment 1, a control system, a delivery mechanism 20 and a feeding mechanism 30. The control system is employed to control working procedures, electrical signals and settings of parameters of the automatic soldering machine 100. The control system comprises a host (not shown), an operation interface 11 connected with the host and a plurality of fiber sensors (not shown). Behind the delivery mechanism 20 on the equipment 1, an insulation removing mechanism 40, a soldering mechanism 50 and an unloading mechanism 60 are installed. Under the delivery mechanism 20 on the equipment 1, a locating mechanism 70 is positioned corresponding to the insulation removing mechanism 40 and the soldering mechanism 50. A plurality of clamps 80 are positioned on the delivery mechanism 20.

Figure 2:
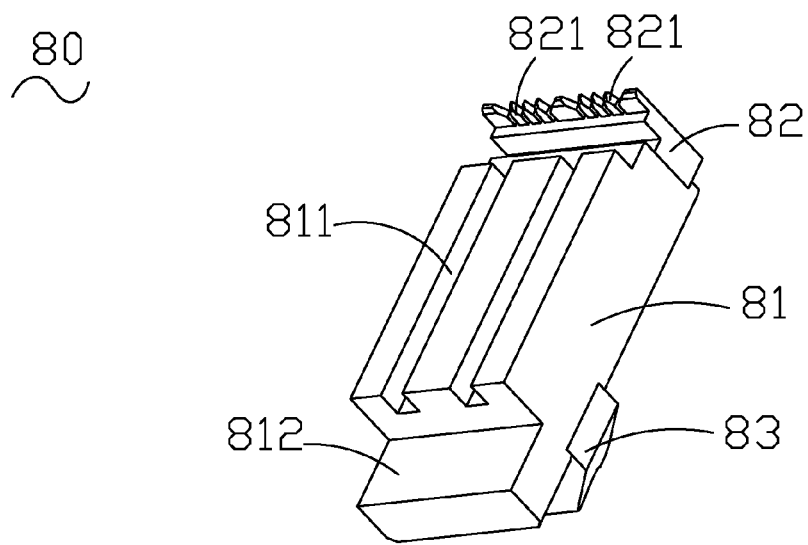
FIG. 2 depicts a structure diagram of a clamp of the automatic soldering machine shown in FIG. 1.

Please refer to FIG. 2. The clamp 80 comprises a wire holder 81 to hold the wire, a wire divider 82 to locate respective core wires and a clamp rib 83. The wire divider 82 is positioned at the back end of the wire holder 81. The clamp rib 83 is fixed at the front end of the under surface of the wire holder 81. The wire holder 81 is shaped as a block. A pair of wire slots 811 is formed through the top surface of the wire holder 81. The wire holder extends forward at the bottom of the front end to form a clamp grip 812. A fix slot (not shown) is formed at the front end of the under surface of the wire holder 81. The wire divider 82 is fixed at the back end of the wire holder 81 and comprises a plurality of teeth 821 and forms a plurality of thru slots (not shown). The clamp rib 83 is shaped as a block. The top end of the clamp rib 83 is fixed with the fix slot and the bottom end of the clamp rib 83 extends outside the fix slot.

Figure 3:
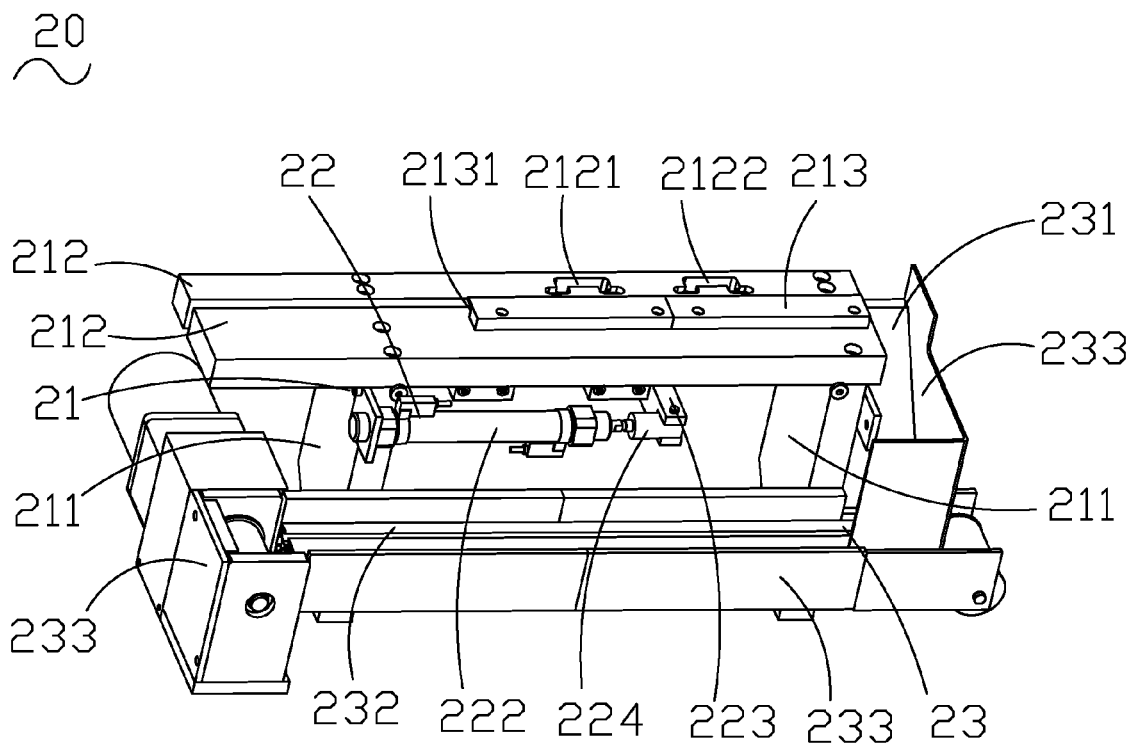
FIG. 3 depicts a structure diagram of a delivery mechanism of the automatic soldering machine shown in FIG. 1.
Figure 4:
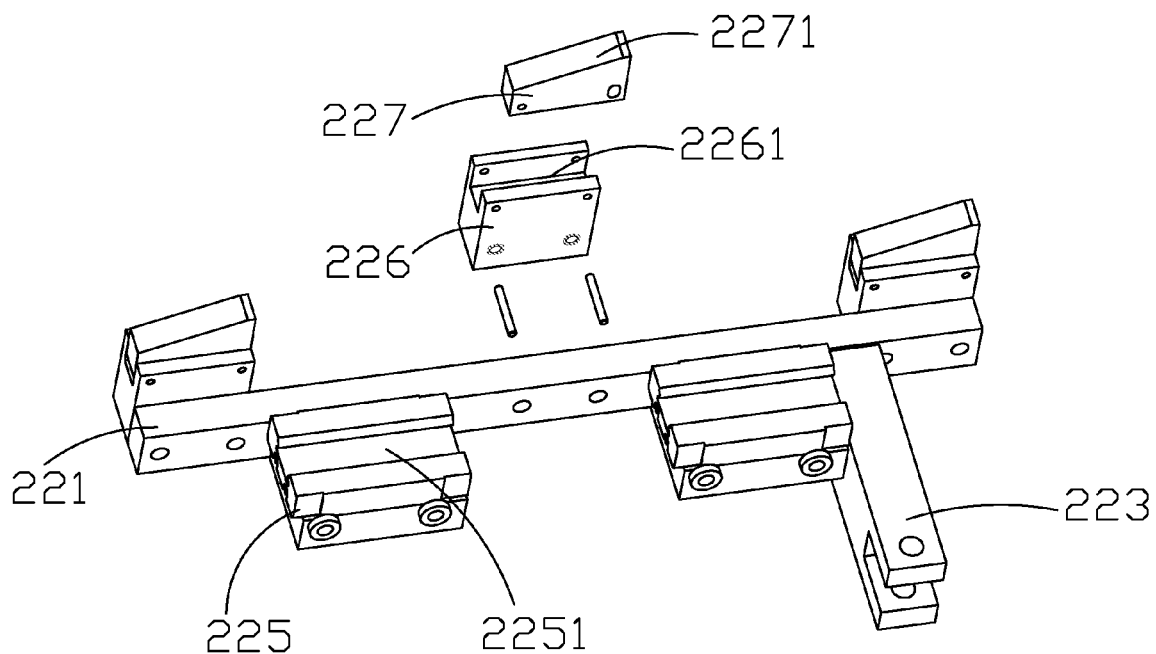
FIG. 4 depicts a structure diagram of a pushing rod of the delivery mechanism of the automatic soldering machine shown in FIG. 1.

Please refer to FIG. 3 and FIG. 4. A delivery mechanism 20 of the automatic soldering machine is electrically connected with the control system and controlled thereby. The delivery mechanism 20 comprises a first delivery track 21, a pushing assembly 22, a second delivery track 23 and a driving device (not shown). The first delivery track 21 comprises a support 211 vertically fixed on the equipment 1. The support 211 is shaped as a standing plate. Two parallel slide tracks 212 are fixed on the top surface of the support 211. The two slide tracks 212 have a regular parallel spacing therebetween. A first thru slot 2121 and a second thru slot 2122 are positioned on the slide track 212 in back corresponding to the insulation removing mechanism 40 and the soldering mechanism 50. A limiter 213 is fixed on the slide track 212 in front. A locator 2131 is set on the bottom surface of the back of the limiter 213. A fiber sensor (not shown) is set at the upper left end of the slide track 212. The clamp rib 83 of the clamp 80 is movably attached between the two slide tracks 212. The clamp grip 812 is slidably limited inside the locator 2131. Therefore, the clamp 80 can be possibly moved in the directions of left and right.

The pushing assembly 22 comprises a pushing rod 221 shaped as a longstrip and a power unit 222 to drive the pushing rod 221. The pushing rod 221 is positioned under the two slide tracks 212. One end of the pushing rod 221 is jointed with a transmission bar 223. A swing arm 224 is set on the transmission bar 223. One end of the swing arm 224 is sleeve jointed with the power unit 222. A plurality of slide blocks 225 are fixed on the front side of the pushing rod 221. A restrict slot 2251 is formed on the top surface of the slide block 225. A plurality of location blocks 226 are fixed on the back side of the pushing rod 221. A spacing between the adjacent location blocks 226 is equal to the spacing between the insulation removing mechanism 40 and the soldering mechanism 50 and also equal to the spacing between the soldering mechanism 50 and the unloading mechanism 60. Accordingly, the pushing rod 221 can push the clamp 80 into a precise position in one time. A groove 2261 extending to the top surface of the location blocks 226 is formed thereon. A lock hole (not shown) is formed in the bottom of the groove 2261. A bump 227 is fixed in the groove 2261. A bevel 2271, which is gradually tilted upwards from the head to the end, is formed on the top surface of the bump 227. A blind hole (not shown) is formed at the bottom of bump 227. A spring (not shown) is set inside the blind hole and the lock hole which are corresponding to each other. A location rod (not shown) is fixed on the bottom surface of the slide track 212 in front. The location rod is positioned in the restrict slot 2251. The pushing rod 221 is fastened to the location rod with the slide block 225. Therefore, the power unit 222 drive the pushing rod 221 to move along the restrict slot 2251 right and left only.

The second delivery track 23 is fixed on the equipment 1 and set in front of the first delivery track 21. The second delivery track 23 comprises a conducting slop 231 positioned at the right end of the first delivery track 21 and a feed belt 232 positioned at the downside in front of the first delivery track 21 to joint with the conducting slop 231. Dead walls 233 are positioned in right of the conducting slop 231 and also positioned in front, in back and in left of the feed belt 232. A driving device (not shown) is installed at the left end of the feed belt 232. The driving device drives the feed belt 232 to move from right to left.

Figure 5:
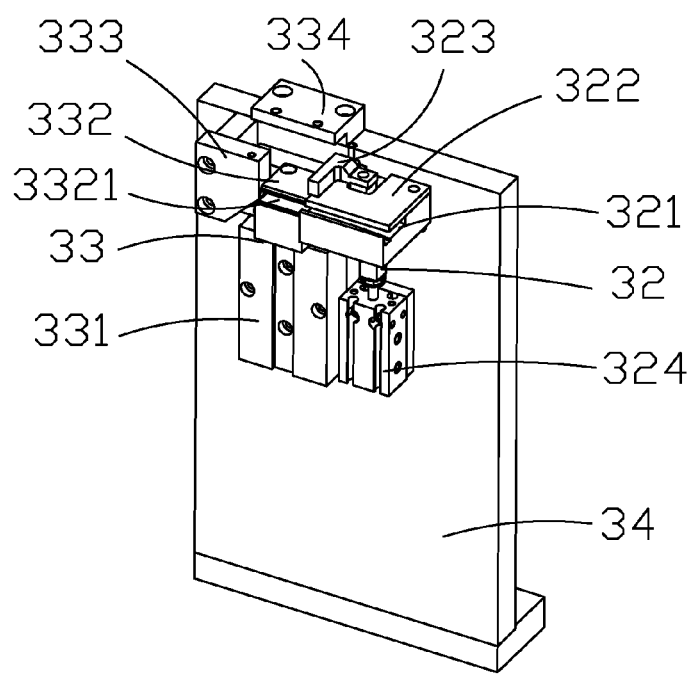
FIG. 5 depicts a structure diagram of a feeding mechanism of the automatic soldering machine shown in FIG. 1 without a vibrating plate.

Please refer to FIG. 1 and FIG. 5. The feeding mechanism 30 is installed at the right side of the slide track 212. The feeding mechanism 30 comprises a vibrating plate 31, a buffer track 32 and a classifier 33. The vibrating plate 31 has a conveying belt 311 and is capable of carrying a plurality of electronic components (not shown). The electronic components can be conveyed to left through the conveying belt 311 after being shaken and put in sequence. The feeding mechanism 30 comprises a support bracket 34 fixed on the equipment 1. The buffer track 32 is fixed on the support bracket 34. The right side of the buffer track 32 adjoins to the left side of the conveying belt 311. The buffer track 32 comprises a U slot 321 and a top cover 322 to cover the U slot 321. A right stop plate 323 is positioned at left of the top cover 322. A first air cylinder 324 is connected with the bottom end of the right stop plate 323. The first air cylinder 324 can move the right stop plate 323 up and down.

The classifier 33 adjoins to the left end of the buffer track 32. The classifier 33 comprises a second air cylinder 331 fixed on the support bracket 34. A classifying locator 332 is fixed at the top end of the second air cylinder 331. The second air cylinder 331 can move the classifying locator 332 up and down. The classifying locator 332 is shaped as a block which a rest slot 3321 is formed at the bottom of the front end and traverses therethrough. The rest slot 3321 can exactly place a pair of electronic components. A left stop plate 333 is fixed on the support bracket 34 at the left side of the classifying locator 332. A fiber sensor is set on the left stop plate 333. A top stop plate 334 is positioned on the top end of the support bracket 34 above the classifier 33 and extends forwards.

Figure 6:
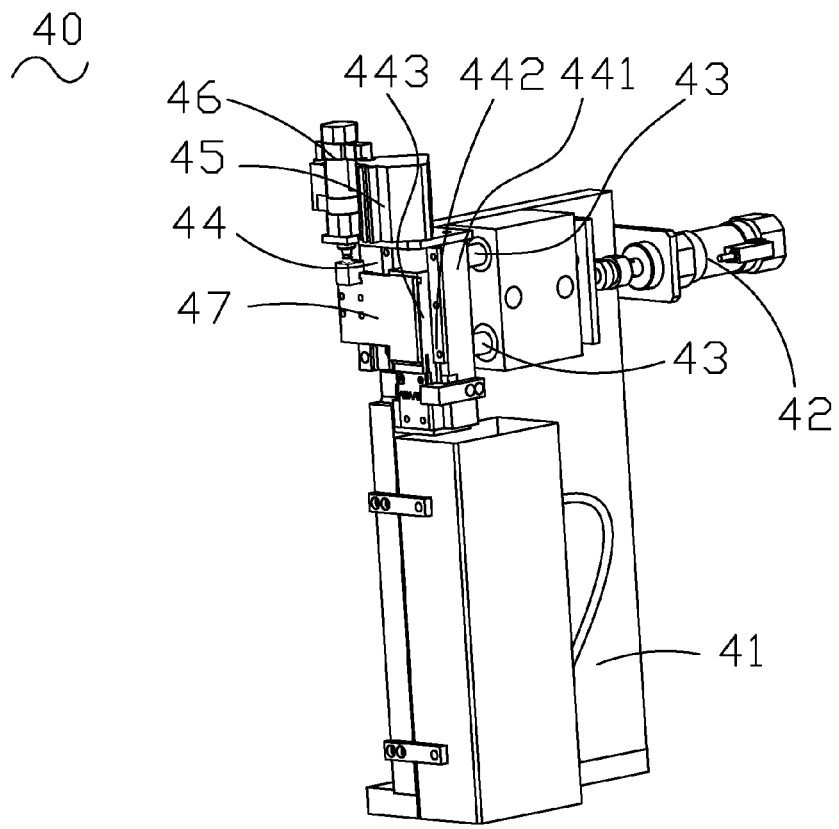
FIG. 6 depicts a structure diagram of an insulation removing mechanism of the automatic soldering machine shown in FIG. 1.
Figure 7:
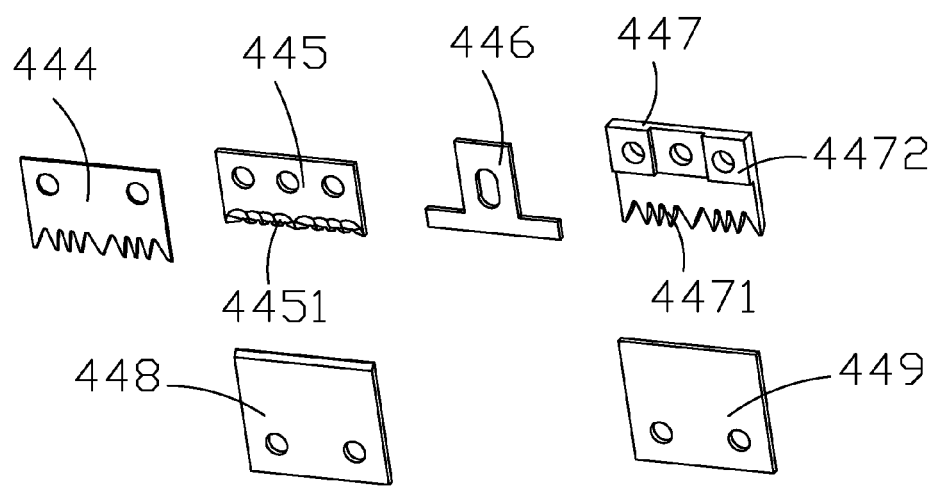
FIG. 7 depicts a structure diagram of strippers and cutters of the insulation removing mechanism of the automatic soldering machine shown in FIG. 1.

Please refer to FIG. 6 and FIG. 7. The insulation removing mechanism 40 is fixedly installed on the equipment 1 at the back side of the thru slot 2121. The insulation removing mechanism 40 comprises a fix bracket 41 fixed on the equipment 1. A horizontal cylinder 42 and a pair of horizontal transmission rods 43 connected with the horizontal cylinder 42 are fixed on the top of the back end of the fix bracket 41. A vertical transmission device 44 is connected with the front end of the horizontal transmission rod 43. The vertical transmission device 44 comprises a base plate 441 jointed with the horizontal transmission rod 43. A vertical cylinder 45 is fixed on the top end of the base plate 441. Two parallel vertical tracks 442 are fixed on the base plate 441 with a regular spacing therebetween. A slide plate 443 is set between the two vertical tracks 442. A first presser 444, a top stripper 445, a second presser 446 and a top cutter 447 are fixed in parallel to each other on the bottom end of the slide plate 443 in sequence. The top stripper 445 appears as a piece and comprises a plurality of arc shaped cutting edges 4451 on the bottom end. The top cutter 447 also appears as a piece and comprises a plurality of teeth 4471 on the bottom end. The teeth 4471 are relatively lower in position than the cutting edges 4451. Protruding ribs 4472 are formed on the top of the top cutter 447. A groove (not numeric) is formed between the protruding ribs 4472. The top of the second presser 446 is fixed inside the groove. The top stripper 445 is fixed on the front of the second presser 446 and maintains a certain spacing from the top cutter 447. A bottom stripper 448 is fixed on the bottom of the base plate 441 corresponding to the top stripper 445 and a bottom cutter 449 is fixed on the base plate 441 corresponding to the top cutter 447. A third air cylinder 46 is fixed on the front of the top end of the fix bracket 41. Two parallel vertical tracks (not shown) are fixed on the top of the front end of the fix bracket 41. A pressing board 47 is positioned on the front end of the fix bracket 41 and closed to the first presser 444 and the top stripper 445. The pressing board 47 can be moved by the third air cylinder 46 up and down along the parallel vertical tracks. The horizontal cylinder 42, the vertical cylinder 45 and the third air cylinder 46 are all electrically connected with the control system. The horizontal cylinder 42 can move the vertical transmission device 44 and the horizontal transmission rod 43 horizontally. The vertical cylinder 45 can move the top stripper 445 and the top cutter 447 vertically.

Figure 8:
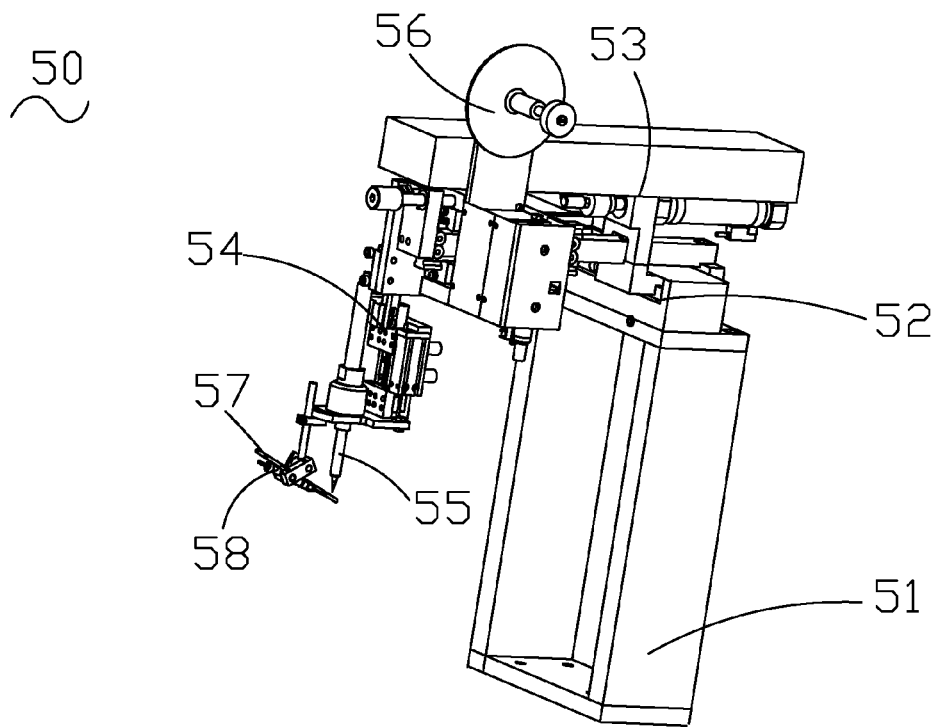
FIG. 8 depicts a structure diagram of a soldering mechanism of the automatic soldering machine shown in FIG. 1.

Please refer to FIG. 3, FIG. 5 and FIG. 8. The soldering mechanism 50 is fixedly installed on the back side of the thru slot 2122 of the equipment 1. The soldering mechanism 50 comprises a fixed mount 51 fixed on the equipment 1, a transverse transfer device 52 fixed on the fixed mount 51, a horizontal transfer device 53 fixed on the transverse transfer device 52, a vertical transfer device 54 fixed on the horizontal transfer device 53 and a soldering gun 55 fixed on the bottom end of the vertical transfer device 54. The vertical transfer device 54 can move the soldering gun 55 up and down. The horizontal transfer device 53 can move the vertical transfer device 54 and the soldering gun 55 back and forth. The transverse transfer device 52 can move the horizontal transfer device 53, the vertical transfer device 54 and the soldering gun 55 left and right. Consequently, the soldering gun 55 can be moved in three directions to any position assigned by the control system. A solder wire reel 56 is fixedly installed at the front end of the horizontal transfer device 53. A solder wire duct 57 and a blower 58 are fixedly installed at one side of the soldering gun 55 at the bottom of the vertical transfer device 54. The solder wire duct 57 and the blower 58 both are electrically connected with the control system. The solder wire is delivered out by the solder wire reel 56 and to be located under the soldering gun 55 by the solder wire duct 57. The blower 58 can be utilized to clean the soldering gun 55. A recycle box (not shown) is fixed in the back of the support bracket 34 for recycling the solder residue cleaned from the soldering gun 55. The soldering mechanism 50 is positioned in the back of the classifier 33. The soldering gun 55 can be moved above the classifier 33.

Figure 9:
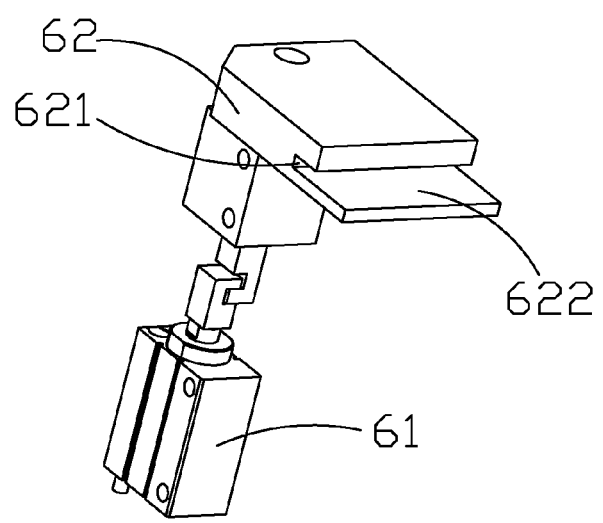
FIG. 9 shows a structure diagram of an unloading mechanism of the automatic soldering machine shown in FIG. 1.

Please refer to FIG. 3, FIG. 8 and FIG. 9. The unloading mechanism 60 is positioned at the right end of the first delivery track 21. The unloading mechanism 60 comprises a first eject air cylinder 61 fixed on the top of the right end of the fixed mount 51 and a separator 62 driven by the first eject air cylinder 61 to move up and down. The separator 62 is shaped as a block. A backward open slot 621 is formed in the middle of the front end of the separator 62 and transverse therethrough. The lower jaw of the open slot 621 extends forwards to form a carrier 622. A fiber sensor (not shown) is set at the inner side of the separator 62.

Please refer to FIG. 3 and FIG. 10. The locating mechanism 70 is positioned under the thru slot 2121 and the thru slot 2122 of the slide track 212 in back. The locating mechanism 70 comprises a second eject air cylinder 71, a moveable location block 72 and a limitation block 73. A locating slot 721 is formed and extended on the top end of the moveable location block 72. Two guiding bevels 722 with certain angles are formed at the two side of the locating slot 721. A via slot (not numeric) is formed through the limitation block 73 vertically. The moveable location block 72 is movably jointed with the via slot. The second eject air cylinder 71 can move the location block 72 upwards to be above the first thru slot 2121 and the second thru slot 212 to locate the clamp 80.

Hereafter, the working procedure of the automatic soldering machine 100 of the present invention is introduced. First, various kinds of parameters of the automatic soldering machine 100 are set in a programmed procedure through the control system and two core wires are manually located in the wire slots 811 of the clamp 80 to make the tops of the core wires through the thru slots of the wire divider 82 and out of the clamp 80. The clamp 80 with the located core wires is put in the left end of the first delivery track 21. The control system activates the pushing assembly 22 to move right and pushes the clamp 80 to the first thru slot 2121.

Thee, the control system controls the second eject air cylinder 71 to reject the movable location block 72 through the first thru slot 2121. At this moment, the clamp 80 is located in the movable location block 72. The control system controls the vertical cylinder 45 of the insulation removing mechanism 40 to move the vertical transmission device 44 downwards. The first presser 444 and the second presser 446 press the wire. The top cutter 447 cuts the top of the core wires out of the wire divider 82 exactly. The top stripper 445 cuts the insulations of the core wires. Meanwhile, the control system controls the third air cylinder 46 to move the pressing board 47 downwards to press the core wires. Then, the control system controls the horizontal cylinder 42 to move the horizontal transmission rod 43 backwards to strip the insulations of the core wires out of the wire divider 82. The control system controls the second eject air cylinder 71 to move the movable location block 72 downwards to the bottom of the slide track 212. The pushing assembly 22 pushes the clamp 80 to the second thru slot 212.

Next, the control system controls the locating mechanism 70 at the second thru slot 2122 to move upwards to locate the clamp 80. Meanwhile, the electronic components with at least one soldering portion are conveyed to the left after being shaken and put in sequence by the vibrating plate 31 of the feeding mechanism 30. Then, by buffered and location corrected by the buffer track 32, the electronic components are conveyed into the rest slot 3321 of the classifier 33. When the pair of electronic components is put in the rest slot 3321, the fiber sensor of the left stop plate 333 sensed the electronic components and the second air cylinder 331 moves the classifying locator 332 upwards. In the meantime, the first air cylinder 324 moves the right stop plate 323 upwards. The left stop plate 333, the right stop plate 323 and the top stop plate 334 gather inwards to locate the electronic components and to make the soldering portions of the electronic components and the conductive tops of the core wires on clamp 80 touch with each other. The soldering gun 55 of the soldering mechanism 50 is then moved to the assigned position to melt the solder wire for soldering the core wires and the soldering portion of the electronic components. The movable location block 72 of the locating mechanism 70 at the thru slot 2122 drops down to the bottom of the slide track 212.

Finally, the control system controls the pushing assembly 22 to move the two clamps 80 carrying the electronic components and the wires to the unloading mechanism 60 at the right end of the first delivery track 21. At this moment, the fiber sensor at the inner side of the open slot 621 sensed the electronic component in the open slot 621 and then, the control system controls the first eject air cylinder 61 to move the separator 62 upwards. Accordingly, the soldered electronic component and the wire are off the clamp 80. The empty clamp 80 is pushed by the clamps behind and off the first delivery track 21. The empty clamp 80 slips along the conducting slop 231 and falls on the feed belt 232. The empty clamp 80 can be repeatedly used by manual retrieval.

As aforementioned, the insulation removing mechanism 40 of the automatic soldering machine 100 cuts the core wires and strips insulations at front ends of the core wires automatically. The soldering mechanism 50 exactly locates the core wires and the soldering portions of the electronic components and solders thereof. The unloading mechanism 60 separates the clamps off from the core wires and the soldering portions. Therefore, a high production efficacy and a stable production quality for soldering process can be realized.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An automatic soldering machine, for soldering a plurality of wires, each exposing at least one core wire and a plurality of electronic components with at least one soldering portion respectively, the automatic soldering machine comprising:
   an equipment;
   a delivery mechanism, installed on the equipment to deliver the wires for soldering;
   a plurality of clamps, positioned on the delivery mechanism to locate the wires;
   a feeding mechanism, installed at one end of the delivery mechanism to convey the electronic components;
   an insulation removing mechanism, installed at one side of the delivery mechanism to cut the core wires and strip insulations of headends of the core wires;
   a soldering mechanism, installed beside the insulation removing mechanism to solder the core wires and the soldering portions of the electronic components;
   an unloading mechanism, installed beside the soldering mechanism to separate the soldered electronic components and core wires off from the clamps; and
   a programmable control system, connected to the delivery mechanism, the insulation removing mechanism, the soldering mechanism and the unloading mechanism, and controlling the delivery mechanism, the insulation removing mechanism, the soldering mechanism and the unloading mechanism, wherein the insulation removing mechanism further comprises a movable vertical transmission device and a horizontal cylinder to move the vertical transmission device horizontally, wherein a top stripper and a top cutter are fixed in parallel to each other on the bottom end of the vertical transmission device in sequence and a bottom stripper and a bottom cutter are fixed on the bottom end of the insulation removing mechanism corresponding to the positions of the top stripper and the top cutter respectively.

2. The automatic soldering machine of claim 1, wherein the top stripper further comprises a plurality of arc shaped cutting edges on the bottom end of the top stripper and the top cutter further comprises a plurality of teeth on the bottom end of the top cutter under the cutting edges.

3. The automatic soldering machine of claim 1, wherein the insulation removing mechanism further comprises a pressing board positioned in the front end of the insulation removing mechanism and a cylinder to move the pressing board up and down.

4. An automatic soldering machine, for soldering a plurality of wires, each exposing at least one core wire and a plurality of electronic components with at least one soldering portion respectively, the automatic soldering machine comprising:
   an equipment;
   a delivery mechanism, installed on the equipment to deliver the wires for soldering;
   a plurality of clamps, positioned on the delivery mechanism to locate the wires;
   a feeding mechanism, installed at one end of the delivery mechanism to convey the electronic components;
   an insulation removing mechanism, installed at one side of the delivery mechanism to cut the core wires and strip insulations of headends of the core wires;
   a soldering mechanism, installed beside the insulation removing mechanism to solder the core wires and the soldering portions of the electronic components;
   an unloading mechanism, installed beside the soldering mechanism to separate the soldered electronic components and core wires off from the clamps; and
   a programmable control system, connected to the delivery mechanism, the insulation removing mechanism, the soldering mechanism and the unloading mechanism, and controlling the delivery mechanism, the insulation removing mechanism, the soldering mechanism and the unloading mechanism, wherein the delivery mechanism further comprises a first delivery track, a pushing assembly and a second delivery track, wherein the first delivery track comprises two slide tracks with a regular parallel spacing and a limiter is fixed on the slide track in front, and the clamps are slidably positioned on the slide tracks and inside the limiter, and the pushing assembly comprises a pushing rod positioned under the two slide tracks and a power unit to drive the pushing rod, and the second delivery track comprises a conducting slop and a feed belt.

5. The automatic soldering machine of claim 4, wherein a plurality of location blocks are positioned on the pushing rod and a spacing between the adjacent location blocks is equal to the spacing between the insulation removing mechanism and the soldering mechanism and equal to the spacing between the soldering mechanism and the unloading mechanism.

6. The automatic soldering machine of claim 4, wherein each of the clamps further comprises a wire holder to hold the wire and a wire divider to locate respective core wires of the wire, wherein the insulation removing mechanism cuts the core wires out of the wire holder exactly and strips the insulations of the core wires.

7. The automatic soldering machine of claim 6, wherein the wire holder of the clamp extends forward to form a clamp grip slidably inside a locator of the limiter and a clamp rib is fixed at the front end of the under surface of the wire holder, movably attached between the two slide tracks.

8. The automatic soldering machine of claim 4, wherein two thru slots are positioned on the slide track in back corresponding to the insulation removing mechanism and the soldering mechanism, wherein at least one locating mechanism is positioned on the bottom end of the thru slot, and the locating mechanism comprises a limitation block, a movable location block and a cylinder connected with the movable location block, wherein a via slot is formed vertically on the limitation block, and the movable location block is movably sleeved in the via slot, and the cylinder can move the movable location block upwards through the thru slot.

9. The automatic soldering machine of claim 5, wherein the soldering mechanism comprises a soldering gun, a vertical transfer device to move the soldering gun up and down, a horizontal transfer device to move the vertical transfer device and the soldering gun back and forth and a transverse transfer device to move the horizontal transfer device, the vertical transfer device and the soldering gun left and right.

10. The automatic soldering machine of claim 5, wherein the unloading mechanism is positioned at the right end of the first delivery track and comprises a separator and a first eject air cylinder, wherein a sensor is set in the separator and the first eject air cylinder can move the separator up and down.

11. An automatic soldering machine, for soldering a plurality of wires, each exposing at least one core wire and a plurality of electronic components with at least one soldering portion respectively, the automatic soldering machine comprising:

an equipment;

a delivery mechanism, installed on the equipment to deliver the wires for soldering;

a plurality of clamps, positioned on the delivery mechanism to locate the wires;

a feeding mechanism, installed at one end of the delivery mechanism to convey the electronic components;

an insulation removing mechanism, installed at one side of the delivery mechanism to cut the core wires and strip insulations of headends of the core wires;

a soldering mechanism, installed beside the insulation removing mechanism to solder the core wires and the soldering portions of the electronic components;

an unloading mechanism, installed beside the soldering mechanism to separate the soldered electronic components and core wires off from the clamps; and a programmable control system, connected to the delivery mechanism, the insulation removing mechanism, the soldering mechanism and the unloading mechanism, and controlling the delivery mechanism, the insulation removing mechanism, the soldering mechanism and the unloading mechanism, wherein the feeding mechanism comprises a vibrating plate, a buffer track docking with the vibrating plate and a classifier adjoining to the buffer track.

12. The automatic soldering machine of claim 11, wherein the buffer track comprises a U slot, a top cover to cover the U slot, and a right stop plate positioned at the left of the top cover, wherein a second eject air cylinder is connected with the bottom end of the right stop plate and the second eject air cylinder is electrically connected with the programmable control system and can move the right stop plate up and down.

13. The automatic soldering machine of claim 11, wherein the classifier comprises a classifying locator and a cylinder to move the classifying locator up and down, and wherein a rest slot is formed through the classifying locator.

14. The automatic soldering machine of claim 13, wherein a left stop plate is fixed at the left of the classifying locator and a sensor is set on the left stop plate, and a top stop plate is fixed on the top of the classifying locator.

* * * * *